UNITED STATES PATENT OFFICE 2,569,843

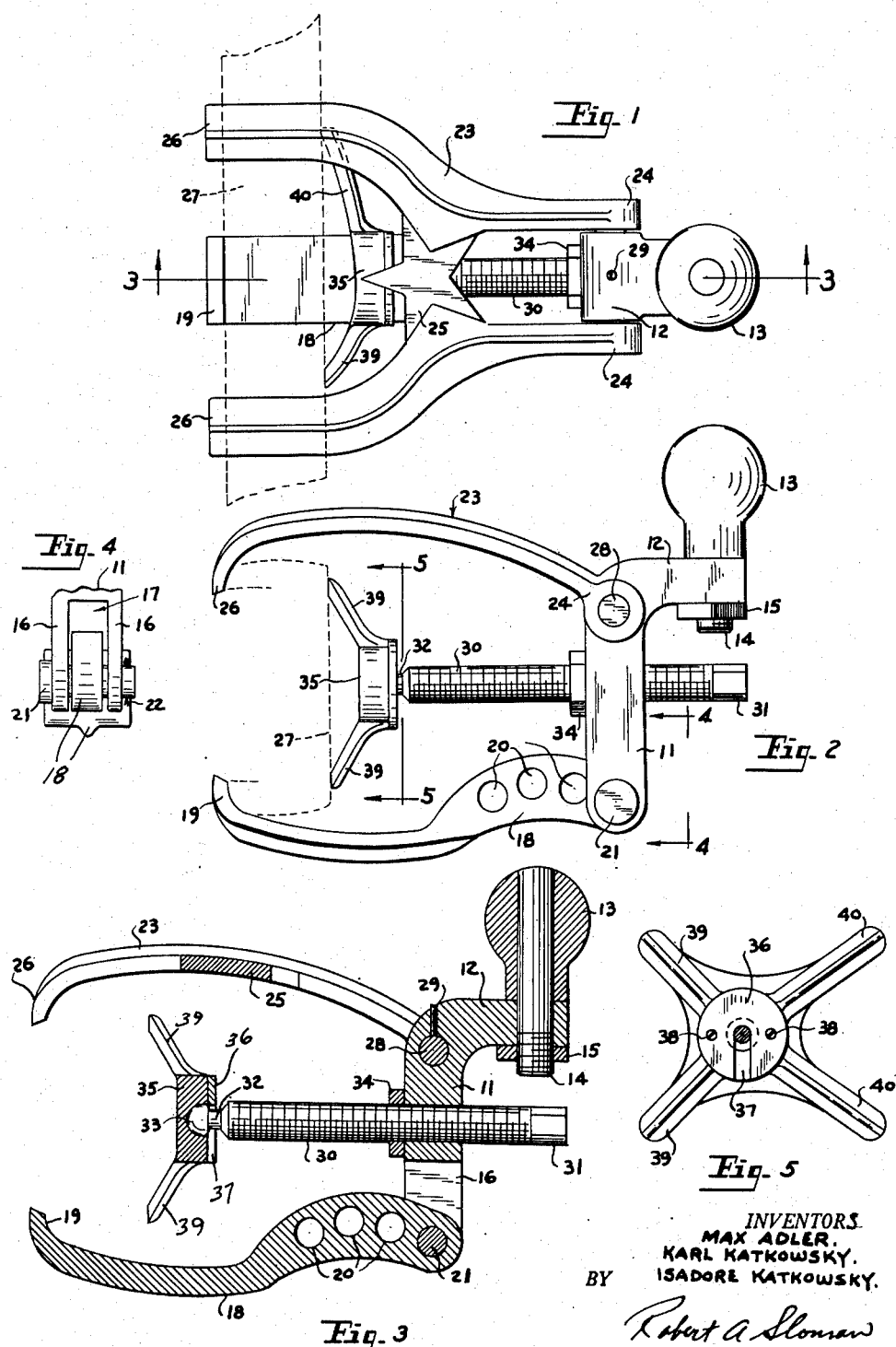

TRAILER HITCH

Max Adler, Karl Katkowsky, and Isadore Katkowsky, Detroit, Mich.

Application September 3, 1949, Serial No. 114,004

3 Claims. (Cl. 280—33.44)

This invention relates to a trailer hitch adapted for attachment to a vehicle rear bumper, and more particularly to a universal trailer hitch which is adapted for attachment to a plurality of sizes and shapes of vehicle bumpers.

Heretofore, it has been necessary to provide a different trailer hitch for each different type and shape of bumper with the result that considerable time was wasted in selecting and properly securing the correct trailer hitch for a particular size and shape of rear bumper.

It is the principal object of this invention to provide a universal trailer hitch having a pair of pivotally mounted spaced bumper gripping clamps or jaws which are readily adjustable to encompass a plurality of different sizes and shapes of vehicle bumpers.

It is the further object of this invention to provide an additional adjustability feature for one of the clamps whereby the hitch may be employed in connection with a bumper which is arranged at an angle. More particularly this object is accomplished by providing a plurality of spaced points whereby one of the clamps may be adjusted relative to the other and to their common support.

It is the further object of this invention to provide a simple and durable trailer hitch construction which is inexpensive to manufacture and which will accomplish the objects set out.

These and other objects will be seen from the following specification and claims in conjunction with the appended drawing in which:

Figure 1 is a plan view of the trailer hitch as secured to a vehicle bumper fragmentarily shown in phantom.

Figure 2 is a side elevational view thereof.

Figure 3 is a section on line 3—3 of Figure 1.

Figure 4 is a fragmentary section on line 4—4 of Figure 2; and Figure 5 is a section on line 5—5 of Figure 2.

It will be understood that the above drawing illustrates merely a preferred embodiment of the invention and that other embodiments are contemplated within the scope of the claims hereafter set out.

Referring to the drawing the trailer hitch includes the upright support 11 with transverse projection 12 at its upper end upon which is mounted spherically shaped trailer attaching element 13. Central shaft 14 projects from the lower end of element 13 and through a corresponding opening in projection 12 of support 11. Said shaft is threaded and secured in position by the lock-nut 15.

The lower end of support 11 is bifurcated at 16 defining the central space 17 within which one end of lower clamp 18 is positioned and secured. The opposite end of clamp 18 is projected upwardly at 19 so as to engage the lower leading edge of a vehicle bumper 27 which is shown in phantom.

Clamp 18 has formed adjacent one end a plurality of longitudinally spaced transverse openings 20 through one of which securing pin 21 extends for supporting pivotally the outer end of clamp 18 within the bifurcated lower portion of support 11.

The pin 21 projects through one of said openings 20 and through corresponding transverse openings formed within the bifurcations 16 of support 11, whereby clamp 18 is pivotally mounted and may be adjusted transversely of its support. A suitable cotter pin 22 is provided as shown in Figure 4 which extends transversely through the reduced end of pin 21.

A second upper bifurcated bumper engaging clamp 23 is pivotally mounted upon support 11 in spaced relation to the pivotal mounting of clamp 18. Clamp 23 includes bifurcations 24 at one end which extend upon opposite sides of the support 11 being pivotally joined thereto by the transverse pin 28. Clamp 23 with central reinforcement 25, also has bifurcated portions 26 which are adapted at their ends to project around the top leading edge of bumper 27.

A transverse upper clamp supporting pin 28 extends through a transverse opening within the upper portion of support 11 in substantial parallel spaced relation to the pin 21 which supports lower clamp 18. Pin 28, immovably secured within support 11 by the set screw 29, projects from opposite sides of support 11 and within corresponding transverse openings at the outer ends 24 of the upper clamp 23.

Intermediate clamp pivot pins 28 and 21 there is provided within support 11 a transverse threaded opening adjustably receiving rotatable shaft 30 which has an outer hex-shaped head 31 to receive a suitable wrench or other operating device for rotating said shaft which is threaded substantially throughout its length.

Reduced shank 32 at the opposite end of shaft 30 terminates in the substantially hemispherical element 33 upon which is universally mounted a third bumper clamping element 35, said shaft 30 carrying a lock-nut 34 adapted for cooperative engagement with support 11 for securing shaft 30 and its clamp 35 in any desired adjusted position.

Clamp 35 has a substantially hemispherically shaped recess formed therein to cooperatively receive the correspondingly shaped element 33 upon the end of shaft 30. Securing disc 36 has a radial slot 37 to slidably receive the reduced shank 32 and to retain the ball-shaped element 33 adjustably within the clamp 35. Screws 38 extend through the disc 36 for securing engagement within corresponding openings in the central portion of clamp 35, whereby said clamp has a universal mounting upon the end of adjustable shaft 30.

The clamp 35 includes a pair of diverging bumper engaging fingers 39 which are arranged at approximately 90 degrees from each other, and a second pair of diverging bumper engaging fingers 40 of slightly different length and shape are arranged upon the opposite side of the clamp 35 forming a part thereof, and being also arranged at approximately 90 degrees from each other.

By the construction and arrangement of the fingers 39 and 40 of the clamp 35 it is apparent that under some conditions the clamp will fit the outer surface of a vehicle bumper in one position better than another depending upon the shape and curvature of the bumper. In view of the universal mounting of clamp 35 the same may be swivelled to any desired position which will provide the best cooperative engagement of the clamp fingers 39 and 40 with the outer surface of the bumper 27. If desired, the outer bumper engaging ends of fingers 39 and 40 may be provided with a resilient substance such as a rubber cap to prevent surface damage to the bumper.

In operation the trailer hitch of the present invention is arranged relative to the central portion of the bumper and the upper and lower bumper engaging clamps are loosely positioned around and over the edges of the bumper corresponding to its leading surface, with the respective gripping elements 26 and 19 positioned substantially as shown in Figure 2 of the drawing.

Thereafter, shaft 30 is manually adjusted relative to the support 11 until its clamp 35 with bumper engaging fingers 39 and 40 cooperatively and compressively engages the outer surface of the bumper as shown in Figure 2. When the shaft 30 has been sufficiently adjusted, that the respective clamps 18, 23, and 35 are effectively secured to the bumper, then the lock-nut 34 may be turned into compressive engagement with the support 11 to lock the shaft 30 and its clamp 35 in such adjusted position, at the same time assuring that the clamps will not be accidentally disengaged from the bumper.

Naturally, and in any convenient manner, the trailer will be suitably secured and attached to the trailer attaching element 13 which in the present embodiment is preferably spherical in shape.

With some bumper constructions it is not possible to secure the trailer hitch to its central portion, and in that case it is necessary to employ a pair of such trailer hitches positioning the same upon opposite sides of the central portion of the bumper. Under this condition there are a pair of spaced trailer attaching elements 13 and a suitable attaching bracket would be required for interconnecting both of said attaching elements to the trailer.

Often times the bumper is not perfectly vertical as is shown in Figure 2, but on the other hand, may be arranged at an angle to the vertical. In this case it may be necessary to adjust the lower clamp 18 with respect to the support 11, and this is accomplished by removing the pin 21 from said support and from the particular opening 20 of the lower clamp 18, adjusting said lower clamp to the desired position, and reinserting the pin 21 through the required transverse opening 20 by which the lower clamp 18 is pivotally supported and mounted.

By the present construction it is apparent from Figure 1 that the upper clamp engages the bumper 27 at a pair of spaced points, whereas the lower clamp 18 engages the opposite side of the bumper intermediate the points of engagement of said upper clamp. Consequently, the present trailer hitch may be effectively secured to the rear bumper of a vehicle and locked thereon by means of the third clamp 35 which is centrally positioned with respect to clamps 23 and 18 for cooperation therewith.

Having described our invention reference should now be had to the claims which follow for determining the scope thereof.

We claim:

1. A trailer hitch adapted for attachment to a vehicle rear bumper comprising an upright support including a trailer attaching element, said support being bifurcated at its lower end, a bifurcated clamp pivotally mounted at one end upon said support with its other end adapted to extend around the upper portion of said bumper, and a second oppositely arranged clamp extending within the bifurcated portion of said support, and pivotally joined thereto in spaced relation to the pivotal mounting of said first clamp with its other end adapted to extend around the lower portion of said bumper, and a screw threadably and adjustably positioned through said support intermediate the pivotal mountings of said clamps and cooperatively engageable with the outer wall portion of said bumper.

2. A trailer hitch adapted for attachment to a vehicle rear bumper comprising an upright support including a trailer attaching element, a bifurcated bumper clamp pivotally mounted at one end upon said support, a second oppositely arranged bumper clamp pivotally mounted at one end upon said support in spaced relation to the pivotal mounting of said first clamp, and a bumper engaging screw threadably and adjustably positioned through said support intermediate the pivotal mountings of said clamps, said second clamp having formed therein a plurality of transverse spaced openings by which said clamp is pivotally mounted relative to said support, and thereby permitting adjustment of the pivotal mounting of said clamp relative to said other clamp.

3. A trailer hitch adapted for attachment to a vehicle rear bumper comprising an upright support including a trailer attaching element, a bifurcated bumper clamp pivotally mounted at one end upon said support, a second oppositely arranged bumper clamp pivotally mounted at one end upon said support in spaced relation to the pivotal mounting of said first clamp, a bumper engaging screw threadably and adjustably positioned through said support intermediate the pivotal mountings of said clamps, and a third clamp mounted for universal self-adjustment upon the end of said screw, said latter clamp including a plurality of spaced radially extending diverging bumper engaging fingers.

MAX ADLER.
KARL KATKOWSKY.
ISADORE KATKOWSKY.

REFERENCES CITED

The following references are of record in the file of this patent:

UNITED STATES PATENTS

| Number | Name | Date |
| --- | --- | --- |
| 2,118,231 | Ricker | May 24, 1938 |
| 2,486,161 | Hughes | Oct. 25, 1949 |